United States Patent [19]

Parker et al.

[11] 3,916,479

[45] Nov. 4, 1975

[54] HINGE AND DETENT MECHANISM

[75] Inventors: Howard W. Parker, Westboro; Arlon G. Sangster, Sterling, both of Mass.

[73] Assignee: Jamesbury Corporation, Worcester, Mass.

[22] Filed: Dec. 13, 1974

[21] Appl. No.: 532,603

[52] U.S. Cl. .......... 16/142; 16/145

[51] Int. Cl.$^2$ .......... E05D 11/08

[58] Field of Search .......... 16/128 R, 142, 145, 180, 16/182, 184, 49, 50, 71, 72, 75, 85

[56] References Cited

UNITED STATES PATENTS

| | | | |
|---|---|---|---|
| 2,874,401 | 2/1959 | Kotkins | 16/145 |
| 3,728,757 | 4/1973 | Lloyd | 16/142 |

*Primary Examiner*—Geo. V. Larkin
*Attorney, Agent, or Firm*—Oblon, Fisher, Spivak, McClelland & Maier

[57] ABSTRACT

An improved hinge and detent mechanism is disclosed which is extremely reliable, provides a positive detent action and is very simple to manufacture. The biasing portion of the hinge and detent mechanism includes a one piece resilient plastic spring panel having flexible leg portions of a unique shape. The hinge structure includes a resilient bearing component into which an appropriately shaped hinge arm is press-fitted. The assembly provides an over-center action for holding the hinge structure in a closed position and also provides a continuously variable biasing force for maintaining the hinge in an open position.

8 Claims, 6 Drawing Figures

HINGE AND DETENT MECHANISM

BACKGROUND OF THE INVENTION

1. Field of the Invention

This invention relates generally to hinge and detent structures, and more particularly to an improved hinge and detent mechanism having a one piece over-center spring assembly.

2. Description of the Prior Art

It is well known that a continuously increasing number of tape transport and tape reading devices have come into existance with the increased need for high speed data processing capabilities and with the increasing popularity of the use of recording tape as a vehicle for handling data. Such tape reading and recording devices generally include a reading or recording head, a transport mechanism for driving the tape and some form of guide mechanism or surface for maintaining the tape in an appropriate relationship with respect to the reading head.

For example, a tape drive of this type may include a pair of centrally disposed sprocket or drive wheels projecting slightly above a guide surface adjacent to which is positioned a reading or recording head. A movable cover panel is generally provided to furnish an upper guide surface for maintaining the tape in cooperation with the sprocket or guide wheels and for permitting ready access to the drive wheels and reading head so that tapes may be conveniently loaded or discharged from the reading head. For convenience of operation, it is generally required that the cover panel structure be hinge-mounted and include an appropriate biasing mechanism which holds the cover in an open position when it is raised for access to the head and drive assembly, and also firmly maintains the cover in a closed position when the drive assembly is in operation so that the guide assembly built into the cover operates effectively.

It will, of course, be apparent that apparatuses in many arts other than that of tape reading also require similar types of cover mechanisms having biasing and detent operations of the type described.

In the past, the provision of such biasing mechanisms has required the use of many individual spring and locking components greatly increasing the cost of manufacturing and assembling cover structures of the type described. Furthermore, special types of relatively complicated hinge assemblies have been required for use with conventional spring and detent mechanisms. In addition to these shortcomings of the prior art, it has also been necessary in the past to use metal components in spring and detent assemblies which have occassionally failed due to metal fatigue after a long period of usage. Furthermore, such prevoiusly used metal components often required lubrication after a large number of usages to keep them operating smoothly and to prevent undesirable wear.

Accordingly, a need exists for an improved hinge and detent mechanism of the type described which eliminates the shortcomings of the prior art, and which is particularly simple to manufacture and assemble.

SUMMARY OF THE INVENTION

Accordingly, one object of this invention is to provide a novel hinge and detent mechanism which is extremely simple to manufacture and assemble.

Another object of the present invention is the provision of a novel overcenter spring structure for a hinge and detent mechanism.

A still further object of the present invention is the provision of a non-metallic spring structure for providing an over-center action in a hinge and detent mechanism.

Yet another object of the present invention is the provision of a novel hinge assembly and hinge and detent spring structure for use in positioning a cover structure.

A still further object of the present invention is the provision of a hinge and detent structure which includes a spring structure comprised of a single panel of resilient, non-metallic material having particularly shaped flexible leg portions.

Briefly, these and other objects of the invention are achieved by the provision of a resilient plastic overcenter spring structure having flexible legs forming a generally M-shaped configuration. A metal hinge arm, which is pressfitted into a suitable support, is engaged by camming surfaces on the flexible legs. The shape of the camming surfaces is such as to provide a detent action when the hinge arm is in its closed position and to provide a continuously varying biasing action for urging the hinge arm toward its open position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
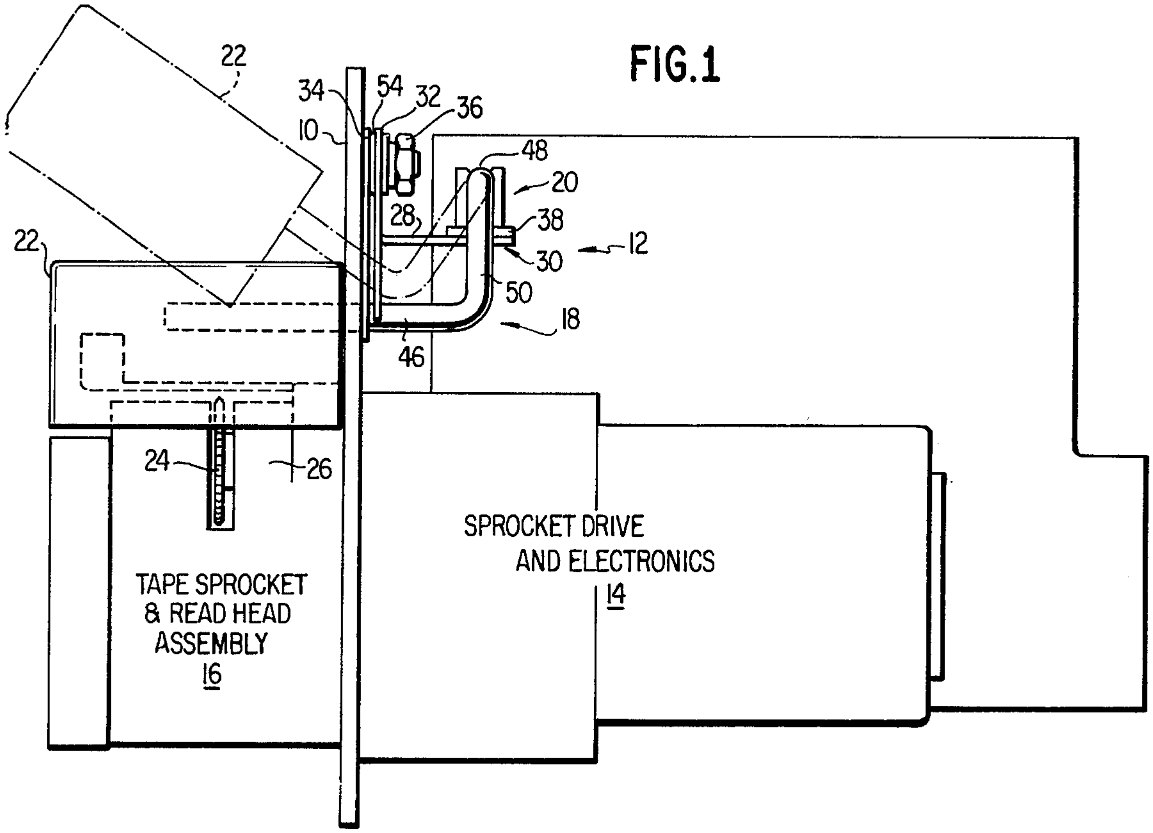
FIG. 1 is a side view of the assembled hinge and detent mechanism of the present invention illustrating the invention in the environment of a tape reader.

Referring now to the drawings, wherein like reference numerals designate identica! or corresponding parts throughout the several views, and more particularly to FIG. 1 thereof, the hinge and detent mechanism of the present invention is illustrated in conjunction with a tape drive mechanism. More particularly, FIG. 1 illustrates a mounting plate 10 to which is secured the hinge and detent assembly 12 of the present invention. A sprocket drive and electronics package 14 and a tape sprocket and read head assembly 16 are also illustrated secured to the mounting plate 10 to establish an exemplary environment for the apparatus of the present invention.

The hinge and detent assembly of the present invention includes a hinge arm secured to a bearing structure 20 by press-fitting, for example, and secured to a cover structure 22 through an appropriate aperture (not shown) in the mounting plate 10. Thus the cover structure 22 may be raised and lowered manually, causing the hinge arm 18 to move in conjunction therewith.

In the illustrated environment of the invention, a sprocket wheel 24 and a tape guide portion 26 are illustrated in conjunction with the tape sprocket and read head assembly 16. This arrangement cooperates with a tape guide segment (not shown) formed in the interior of the cover structure 22. In operation, the cover structure may be raised so the tape can be conveniently placed over the sprocket wheel 24 in the tape guide 26, so that it passes in proper relationship to an internal reading head (not shown). The cover 22 is then lowered into proper position so that its interior guide portions maintain the tape in contact with sprocket wheel 24 and lower tape guide 26. It will, of course, be understood that the present invention is in no way limited to use with a tape drive assembly, but can be used in any environment in which the detent and biasing action of the hinge assembly would be convenient or beneficial.

Referring again to the details of the hinge and detent assembly 12, the bearing structure 20 is mounted on a platform 28 forming a portion of a bracket 30. The bracket 30, which is preferably formed of a metal stamping, also includes a fastening plate 32 formed at a right angle with respect to platform 28. The unique spring structure of the present invention 34 is secured between the fastening plate 32 of the bracket 30 and mounting plate 20 by means of a pair of bolts 36, or other suitable fastening means.

Figure 2:
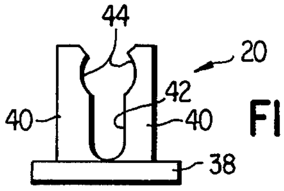
FIG. 2 is a side view of the hinge bearing member of the present invention.

The bearing structure 20 is illustrated in more detail in FIG. 2 as including a base 38 having two upstanding arms 40 formed integrally therewith. An opening 42 separates the arms 40, and each of the arms 40 includes a groove 44 having an arcuate configuration for gripping a portion of the hinge arm 18. The bearing structure is preferably formed of a suitable plastic material such as polyethylene or Celcon (TM). Such a plastic material permits the arms 40 to be flexed slightly so that the hinge arm 18 can be press-fitted into the grooves 44 to be retained therein.

Figure 3:
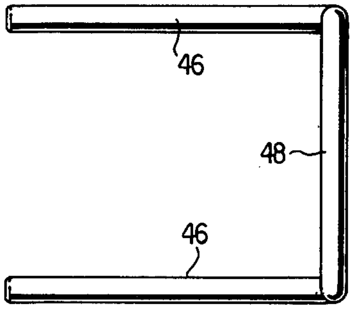
FIG. 3 is a top view of the hinge arm of the present invention.

The preferred shape of the hinge arm 18 is illustrated more clearly in FIG. 3 as including a pair of arms 46 adapted to be secured to the cover structure 22 and connected by a cross member 48, which is the portion of the hinge arm engaged by the bearing structure described above. The arms 46 are joined to the cross member 48 by a pair of riser arms 50, shown more clearly in FIGS. 1 and 6. The arms 46, cross member 48 and riser arms 50 are all preferably formed of a single piece of round metal stock, with each of the various portions bent at a 90° angle with respect to the others.

Figure 4:
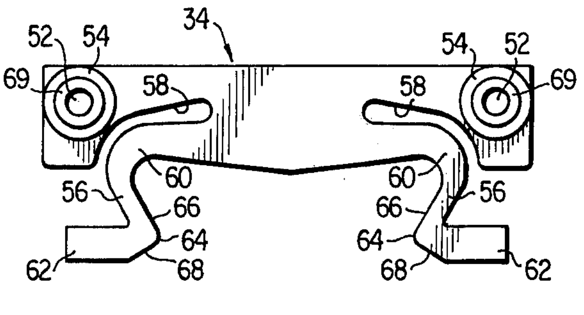
FIG. 4 is a plane view of the one-piece spring structure of the present invention.
Figure 5:
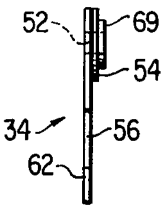
FIG. 5 is a side view of the one-piece spring structure illustrated in FIGS. 4 and 6.

The unique spring structure 34 of the present invention is shown in more detail in FIGS. 4 and 5. Referring particularly to FIG. 4, the spring is shown as including a generally flat body of a suitably resilient plastic material, such as polyethylene plastic or Celcon. Mounting apertures 52 are formed at opposite sides of the main body portion of the spring 34, and each aperture is surrounded by a spacer structure 54 preferably formed integral with the main spring body and comprising raised annular portions, preferably formed in two steps or tiers.

A pair of spring legs 56 are formed integral with the main spring body, the left leg having a generally S-shaped configuration and the right leg being a mirror image thereof. These legs, which together with the main spring body form a generally M-shaped configuration, are separated at their upper extremities from edge portions of the main spring body by elongated openings 58 so that the upper extremities of the spring legs are permitted to flex relative to the main spring body. The spring legs 56 each include a curved knee portion 60 between the upper and lower portions thereof, below which foot portions 62 are formed integrally with the spring legs 56 and oriented parallel to the upper portion of each leg, but generally perpendicular to the intermediate portions thereof.

Each of the legs 56 if straightened, would be seen to have a continuously diminishing width, until the foot portion is reached, at which point the width is again substantially increased. This tapered thickness of the spring legs provides a proper spring constant for each leg to provide optimum performance in the context of the present invention.

A nose portion 64 is formed at the inner edge of each foot portion 62 at approximately the junction between the foot portion and each spring leg 56. Each nose portion has a high radius of curvature at the central protrusion thereof, and includes angled ramp or camming surfaces 66 and 68 respectively above and below the central protrusion of the nose portion for engaging the hinge arm 18. The angular relationship of these camming surfaces and their orientation with respect to the nose portion 64 controls the spring force applied to the hinge arm 18 as it is moved relative to these various surfaces. The nose portions 64 having the oppositely inclined camming surfaces 66 and 68 adjacent thereto also provide an over-center action, as will be more fully explained subsequently.

Figure 6:
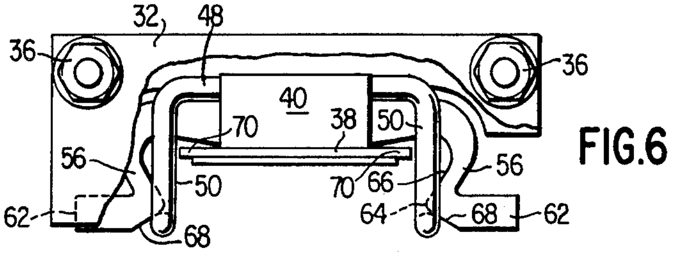
FIG. 6 is a partially cut-away rear view of the assembled hinge and detent mechanism of the present invention.

Referring now to FIG. 6, the operation of the spring and detent assembly of the present invention will be explained in more detail. FIG. 6 illustrates the spring 34 secured in position as shown in FIG. 1. The spacers 54 cause the fastening plate 32 to remain out of engagement with the spring legs 56, so that the spring legs are free to move without frictional interference. FIG. 6 illustrates the position of the hinge and spring arms when the cover portion is closed. As shown, in this position the nose portion of each spring leg 56 is positioned above a portion of the hinge arm so that the hinge arm engages both of the lower camming surfaces 68. As the cover portion 22 is raised, by manual force for example, the portion of the hinge arm engaging the camming surfaces 68 is moved upwardly due to the lever action of the riser arms 50 of the hinge structure. As a result upward motion of the hinge arm causes the spring legs 56 to be cammed outwardly, increasing the tension on the spring legs and resisting the upward motion of the hinge arm. The angle of the camming surfaces 68 determines the degree of displacement in the spring legs 56 caused by a given movement of the hinge arm, and thus provides a means of regulating the force resisting movement of the hinge. This restraining force provides the detenting action for maintaining the hinge in its "closed" position, illustrated in the drawings.

As the cover portion 22 is raised further, the hinge arm slides up the camming surfaces 68 until it engages the tip of each nose portion 64, where a neutral biasing force is applied to the hinge for a brief angular interval. Above this position, the hinge arm comes into engagement with upper camming surface 66 whereby the hinge arm is biased in an upward direction by the inwardly directed force of the spring legs. Again, the angle of the camming surfaces 66 influences the magnitude of the upward biasing force. The camming surfaces 66 thus urge the hinge arm 18 toward its open position, to maintain the cover 22 in the open position (illustrated in phantom in FIG. 1).

A significant aspect of the present invention resides in the fact that the cover, hinge and detent components all constitute one unit. As a consequence, assembly of this unit with the remainder of the reader is facilitated, since proper placement of the cover relative to the lower portion of the read head automatically assures that the detent mechanism will still be aligned and the detent action will be smooth.

It is noted that the base 38 of bearing structure 20 has extensions 70 (FIG. 6) closely fitted with minimal clearance to riser arms 50, providing lateral control of the spacial relationship between cover structure 22 and read head assembly 16.

Spring element 34 may have two locator protrusions 69 (FIG. 5) thereon which mate with corresponding recesses in fastening plate 32 thereby providing additional alignment assistance.

It will be apparent to those skilled in the art that the oppositely inclined camming surfaces 66 and 68 separated by the protuding nose portions 64 provide an over-center action in the operation of the spring of the present invention. Thus, the spring structure of the present invention may be characterized as an over-center spring assembly in addition to being characterized as a spring and detent assembly.

It is noted that the thickness of the spring body can be varied and the dimensions of the spring legs can be expanded or reduced to provide a wide range of cover structures, etc. have various sizes and weights.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A hinge and detent assembly comprising:

frame means for providing a supporting structure, bearing means fastened to said frame means for providing a pivot for said hinge, a hinge arm movably coupled to said bearing means, over-center spring means secured to said frame means for applying biasing forces to said hinge arm, said over-center spring means including at least a first resilient leg portion having oppositely inclined camming surfaces thereon for engaging said hinge arm, said camming surfaces separated by a nose portion for providing an over-center action in the biasing forces supplied by said spring means.

2. A hinge and detent assembly as in claim 1, wherein:

said first resilient leg portion includes a generally S-shaped curvature and has a varying thickness along its length.

3. A hinge and detent assembly as in claim 2, further comprising:

a cover structure coupled to said hinge arm for movement therewith, said cover structure, hinge arm and over-center spring means coupled together so that all of said elements move as a unit.

4. A hinge and detent assembly as in claim 2, wherein:

said over-center spring means includes a second resilient leg portion which is formed as a mirror image of said first resilient leg portion.

5. A hinge and detent assembly as in claim 4, wherein:

said over-center spring means including said first and second resilient leg portions is formed in a generally M-shaped configuration.

6. A hinge and detent assembly as in claim 1, wherein:

said over-center spring means is formed of plastic.

7. A hinge and detent assembly as in claim 6, wherein:

said bearing means is formed of a resilient plastic material and includes a pair of upstanding arm portions having grooves therein for gripping said hinge arms.

8. A hinge and detent assembly as in claim 7, wherein:

said hinge arm includes a cross member engaged by said bearing means, a pair of riser arms formed at opposite ends of said cross member, and extension means on said bearing means closely aligned with said riser arms to facilitate lateral alignment between said bearing means and said riser arms.

* * * * *